3,026,307
CONTINUOUS SOLUTION POLYMERIZATION OF METHYL METHACRYLATE

William F. Gorham, Berkeley Heights, and Denys F. Brandon, Newark, N.J., assignors to Union Carbide Corporation, a corporation of New York
No Drawing. Filed July 5, 1956, Ser. No. 595,871
6 Claims. (Cl. 260—89.5)

This invention relates to a process for the continuous solution polymerization of methyl methacrylate in cumene and related alkylated benzene solvents.

The polymerization of methyl methacrylate is generally believed to be a free-radical type reaction involving the consecutive addition of monomer to a growing polymer chain. The polymerization can be initiated either by thermal action or by the use of a free radical catalyst. Heretofore, batch methods of polymerizing methyl methacrylate have been most widely accepted for the commercial production of polymethyl methacrylate. Acceptable and economical continuous processes for production of usable polymethyl methacrylate resin have, heretofore, not been known.

Methyl methacrylate polymers generally are characterized by having an unusually high clarity, are quite stable, and well suited to casting, molding, and extruding operation. Polymers considered most useful for such applications are generally presumed to have average molecular weights of between 20,000 and 200,000, and corresponding reduced viscosities in chloroform of 0.4 to about 1.0, measured as a 0.2 percent solution at 25° C.

Polymerization methods for the production of such usable polymers have not been altogether desirable. Bulk polymerization methods, for example, have been found to be undesirable as the polymerization is autocatalytic in nature and as such is unacceptable for continuous production methods. The lack of control over the rate of polymerization, particularly after about 15–25 percent reaction has taken place, has hindered exploitation of this method for continuous polymerization. Molecular weights of the polymers produced by the bulk polymerization method are generally presumed to be between about 200,000 and 1,000,000. The molecular weight of such products is generally so high that the products have little commercial use. Batch suspension methods are most commonly employed in industrial applications. While the products of suspension processes have good properties and the process is controllable, the process is not readily adaptable to continuous methods and is relatively expensive. This has kept the cost of polymethyl methacrylate high in relation to the cost of other polymeric materials. A satisfactory continuous process for producing such products would be highly desirable.

Solvent polymerization methods have heretofore been little more than of a theoretical interest. In some cases, solvent polymerization has given products of unexpectedly high molecular weight in polymerization reactions which were difficult to control. Heretofore, no solvent polymerization process has been found to be so controllable as to lend itself to commercial applications, let alone in continuous processes.

According to the present invention, we have found that methyl methacrylate polymer of a usable and predictable molecular weight can be consistently and controllably produced in a process which includes the steps of forming a solution of methyl methacrylate in an alkylated benzene solvent, heating the solution in an enclosed heating zone to a polymerization temperature of at least 135° C. for a period sufficient to polymerize a portion of the methyl methacrylate and subsequently removing the solvent and unreacted monomer.

Best operation of this invention is secured when the solution of the alkylated benzene solvent and methyl methacrylate is maintained at a temperature between about 135° C. to about 170° C. to form polymethyl methacrylate in amounts constituting between 25 percent to about 55 percent by weight of the reaction mixture. Thereafter, a portion of the reaction mixture can be continuously withdrawn while adding additional amounts of the solution of methyl methacrylate to the first heating zone at a rate such that the polymethyl methacrylate content of the reaction is maintained between about 25 and about 55 percent by weight. The removed portion of the reaction mixture is then devolatilized, preferably by heating in a second heating zone at a temperature between about 160° C. and 300° C. and the substantially devolatilized polymethyl methacrylate continuously discharged. In this manner of operation, continuous production of polymethyl methacrylate of a controlled molecular weight is possible at a rate of about two to four pounds of polymer per hour per gallon of reaction volume.

The solution of methyl methacrylate monomer and the alkylated benzene solvent used in this process should contain from about one to three parts by weight of methyl methacrylate monomer per part of the solvent for best results, and more preferably about two to three parts of methyl methacrylate monomer per part of solvent. If desired, a polymerization catalyst can also be present in this solution, for the methyl methacrylate readily polymerizes either with or without benefit of a catalyst. Free-radical catalysts, for example, benzoyl peroxide, p-menthane hydroperoxide, bisazodiisobutyronitrile, and cumene hydroperoxide, have been found to provide excellent results. Amounts of from about 0.0 to about 0.4 part by weight per hundred parts of methyl methacrylate monomer provide good results. When using a catalyst in this process, we prefer amounts of from about 0.05 to about 0.25 part by weight per hundred parts of monomer.

While not desiring to be bound by any particular theory of reaction, it is believed that the alkylated benzene solvents used in this process serve as chain transfer agents in the polymerization. Alkylated benzene solvents having at least one alkyl group attached to the benzene ring through a secondary carbon atom or at least two alkyl groups other than methyl attached to the benzene ring through primary carbon atoms to the benzene ring can be employed as the chain transfer solvent. The solvent should also have a boiling point between 150° C. and 250° C. in order to be completely removed in the second heating zone of this process. Cumene is the preferred chain transfer solvent for use in this process, although other alkylated benzenes such as isopropyl toluene, isopropyl ethyl-benzene, diisopropyl benzene, diethyl benzene, triethyl benzene, and the like are suitable. Cumene is preferred because of the ease of reaction and control achieved, and the ease of removal in the second heating zone.

In the operation of this process, precise control over the average molecular weight of the final polymer can be achieved. We have found that this control is achieved by precise control over (a) the monomer/solvent ratio, (b) percent catalyst, (c) reaction temperature, and (d) reactor polymer solids content. For instance, by increasing the monomer/cumene ratio and holding all other factors constant, the average molecular weight of the polymer increases. If the percent catalyst is increased, with all other factors constant, the average molecular weight of the polymer decreases. If the reaction temperature increases and all other factors are constant, the molecular weight also decreases. If instead the amount of reactor solids is increased with other factors constant, the molecular weight of the polymer decreases.

In illustration of these features, by holding the reaction temperature at about 160° C., the catalyst at 0.15 part by weight per hundred parts of monomer, and reactor solids at 48 percent, increasing the monomer-cumene ratio from about 70/30 to 80/20 increases reduced viscosity of the polymer produced from about 0.51 to about 0.65. If instead the monomer to cumene ratio is maintained at 70/30 and the catalyst concentration is increased to about 0.25 part per hundred parts of monomer, the reduced viscosity of the polymer decreases from about 0.51 to about 0.40. By maintaining the original catalyst concentration at about 0.15 part per hundred parts of monomer and increasing the reaction temperature to about 170° C., reduced viscosity of the polymer will decrease from about 0.51 to about 0.40. If instead, the reactor solids are increased from about 48 percent to about 55 percent, with all other factors at their original level, the reduced viscosity of the polymer will decrease from about 0.51 to about 0.40.

The process is preferably initiated by filling the reactor with the methyl methacrylate monomer-cumene mixture, adding the catalyst if such is to be used, and heating the mixture to the reaction temperature. It is necessary that the mixture be maintained in the first heating zone at between about 135° C. to about 170° C., and preferably between about 155° C. and 165° C. until the amounts of polymethyl methacrylate in the reaction mixture is at least 25 percent and not over 55 percent. Superatmospheric pressures within the range of 15 to 100 p.s.i.g. can be employed to secure the desired reaction conditions. When the amount of polymeric solids in the reaction is within 25 and 55 percent and preferably about 50 percent, a portion of the reaction mixture is continuously withdrawn to the second heating zone, and additional methyl methacrylate monomer-cumene mixture continuously added to the reaction. For continuous operation over long periods of time, it is preferred that the rate of removal of the reaction mixture and rate of addition of the methyl methacrylate monomer-cumene mixture should be adjusted so that the polymer solids content in the reaction mixture is maintained within the range of 25 to 55 percent by weight of the reaction mixture.

The amount of polymeric solids in the reaction mixture can be directly determined from a sample of the reaction mixture by precipitation of the polymer in excess methanol, filtering, drying, and weighing the precipitate. In continuous operation under steady state conditions, the polymer solids content is determined by dividing product rate per hour by total feed rate per hour.

The second heating zone is necessary in the operation of this invention in order to remove the volatile matter, i.e. the cumene and unreacted monomer, from the polymeric solids. This chamber can be operated at a temperature within the range of about 160° C. to 300° C. The optimum temperature selected is dependent upon the residence time in this chamber with both factors so selected that substantially all of the volatile matter is removed from the polymer in this zone. In this process we prefer a temperature of about 200° C. at reduced pressures of about 50–100 mm. Hg pressure. However, other temperatures within this range can be used, and with pressures ranging from 1 mm. Hg up to 760 mm. Hg.

Inasmuch as the removed portion of the reaction mixture contains between about 25 and 55 percent polymer solids and is quite viscous, it is necessary to mechanically work the mass while removing the volatile matter, preferably in an oxygen-free atmosphere. Best operation of our process is achieved by milling the portion of the reaction mixture removed in this second heating zone for a total residence time of one to ten minutes, in a vacuum mill such as described in the patent to Marshall, U.S. 2,434,707, issued January 20, 1948. During this period of heating and mastication in the Marshall mill, a given sample of material is devolatilized of the solvent and any unreacted methyl methacrylate monomer. The polymer discharged from the second heating zone as a very viscous strand contains only a slight amount of such materials, e.g. usually less than 5.0 percent. The temperature, pressure, residence time, and size of the second chamber can all be varied to achieve volatile matter to as low as 1.5 percent or lower. Means other than milling the polymer mass can be used to remove the volatile matter, for instance, kneading in a vacuum kneader, drying in thin sheets in a vacuum drier or even precipitation of the polymer in a non-solvent.

In continuous operation of this process, it is desirable to condense the solvent and monomer removed in this devolatilization step and reuse or recycle them in the process. Thus by dissolving additional methyl methacrylate monomer in the condensed volatile mixture up to original strength, economical operation is secured, with only slight losses of solvent.

The polymeric solids after removal from the second heating zone should be substantially devolatilized, that is, containing about 5.0 percent or less of solvent and unreacted monomer, and preferably about 1.5 percent or less. If reduced pressures are used to promote devolatilization, the mass will have to be extruded or otherwise mechanically removed from the chamber at a rate substantially equivalent to the rate of addition of the methyl methacrylate monomer if continuous operation at optimum efficiency is to be achieved.

The polymethyl methacrylate produced by this process possesses excellent clarity and all desirable properties of commercial polymethyl methacrylate. The average molecular weight of the polymers of this invention can range from about 20,000 to about 80,000. For practical purposes, we prefer the reduced viscosity method for determining molecular weight, with reduced viscosity determined by dissolving 0.2 gram of the polymeric product in 100 grams of chloroform and the viscosity measured at 25° C. These products have reduced viscosities ranging between 0.4 and about 0.8, which are presumed to correspond to average molecular weights of the polymers of about 20,000 and about 60,000 to 80,000, respectively, the average molecular weight increasing as a function of the reduced viscosity. The products are further characterized by having A.S.T.M. standard heat distortion temperatures of between about 70° C. and 90° C., the temperature depending primarily upon whether a plasticizer is present in the product.

If a plasticizer is to be employed in the product, we have found it advantageous to add it during the working in the second heating chamber. Being substantially nonvolatile at these temperatures, addition during the milling produces a homogeneous mixture of the plasticizer in the polymer.

This process allows for efficient operation on any scale to continuously produce polymethyl methacrylate resins of controlled molecular weights. The process even on a large scale is economical and allows for precise control over the molecular weight and possesses all the advantages the continuous operation has over batch operation. This process is ideally suited to the continuous polymerization equipment described in U.S. Patents 2,496,653 and 2,614,910.

The following examples are illustrative. All parts are parts by weight.

*Example 1*

A mixture consisting of 65 parts of methyl methacrylate dissolved in 35 parts of cumene was added to a one gallon jacketed reactor and heated. The temperature was slowly raised to 160° C. over a 2 hour period, and maintained at 90 p.s.i.g. pressure at this temperature for four more hours, at which point the reaction mixture contained 26–28 percent polymer solids as determined by precipitation of the polymer from a sample of the reaction mixture, filtering, drying, and weighing the polymer. Part of the reaction mixture was continuously removed from the reactor at a rate of about 2.5 pounds per hour through a back pressure valve set at 90 p.s.i.g. to the second heating chamber, and an amount of the initial 65/35 methyl methacrylate-cumene mixture equivalent to the amount of reaction mixture removed was continuously added to the reaction mixture to maintain a constant volume in the reactor and a constant solids content of about 27 percent. The volatile material in the removed portion was removed by continuous milling of the polymer-containing mixture in the second heating chamber consisting of a vacuum milling chamber similar to that described in U.S. Patent 2,434,707 to Marshall using milling speeds which gave substantial mastication of the viscous mass. The milling was conducted at 200° C. at 50 mm. Hg pressure until the methanol-soluble content, i.e. cumene and unreacted monomer, in the polymer was less than 1.5 percent. A total residence time in the milling chamber of about one to ten minutes achieved the devolatilization.

The polymer was continuously discharged from the milling chamber as a viscous strand at a rate of about 0.7 pound per hour, was air cooled and stretched about 200 percent and cut into ⅛ inch lengths convenient for subsequent molding or extruding operations. The polymer had a methanol-soluble content of less than about 1.5 percent and a reduced viscosity of 0.70 in chloroform at 25° C.

Operation in this manner was conducted for 100 hours, producing 70 lbs. of usable polymethyl methacrylate.

*Example 2*

A mixture consisting of 70 parts of methyl methacrylate, 30 parts of cumene and 0.07 part of p-menthane hydroperoxide was added to a one gallon jacketed reactor and heated. The temperature was slowly increased to 160° C. over a four hour period, and the temperature maintained at that level for four hours at 90 p.s.i.g. pressure, after which the polymer solids in the mixture was about 44–46 percent as determined in the manner described in Example 1. Part of the reaction mixture was continuously removed at a rate of about five pounds per hour through a back pressure valve to a second heated chamber as in Example 1.

An amount of the initial feed mixture at a rate equivalent to that removed was continuously added to the reaction mixture to maintain a constant volume and constant polymer solids in the reaction mixture of about 45 percent. The part of the reaction mixture removed was continuously milled in the heated milling chamber as described in Example 1 at 200° C. and 50 mm. Hg pressure for a total residence time of one to ten minutes while being mixed with dioctyl phthalate as a plasticizer. The amount of dioctyl phthalate added was regulated at about 62 grams per hour so that the final product would contain about 6 percent by weight of the plasticizer. The cumene and unreacted methyl methacrylate were volatilized in the milling chamber, and the plasticized, devolatilized product was continuously discharged as a viscous strand at a rate of about 2.3 pounds per hour. The strand was air cooled, stretched about 200 percent, and cut into ⅛ inch segments for molding or extruding.

The polymethyl methacrylate produced had a methanol insoluble content of 92.5–93 percent, the soluble components comprising 6 percent dioctyl phthalate and about 1.5 percent residual cumene and monomer. It had a reduced viscosity of 0.52 in chloroform at 25° C., and a flow time of 75–125 seconds for traveling 1½ inches in a ⅛" bore tester at 1000 p.s.i. at 160° C.

Operation in this manner was conducted for 40 hours, producing 92 pounds of usable polymethyl methacrylate.

*Example 3*

A mixture of 75 parts of methyl methacrylate, 25 parts of cumene and 0.056 part of cumene hydroperoxide was fed to a ten gallon autoclave which was maintained about 70 percent full during operation. The mixture was slowly heated with agitation for six hours until the temperature rose to 160° C. at a pressure of 40 p.s.i.g. and these conditions maintained for four hours. After this period, the reaction mixture contained 54–56 percent solids. Part of the reaction mixture was continuously removed at a rate of about 21 pounds per hour and replenished with an equivalent amount of the initial 75/25 methyl methacrylate mixture containing the catalyst. The removed portion was fed to a heated vacuum milling chamber consisting of an enlarged version of the previously described equipment, and milled at 200° C. at 50 mm. Hg pressure with dibutyl sebacate as a plasticizer. The plasticizer was added to the milling chamber at a rate of about 315 grams per hour so as to maintain about a 6 percent concentration of plasticizer in the product. The polymer was extruded from the milling chamber at a rate of about 11.5 pounds per hour, having a methanol-soluble content of 7–7.5 percent which consisted of the 6 percent plasticizer and 1 to 1½ percent residual solvent and monomer. The polymer had a reduced viscosity of 0.66 to 0.68 in chloroform at 25° C. and a flow time of 140–180 seconds to travel 1.5 inches in a flow tester having a ⅛ inch bore under 1000 p.s.i. at 160° C.

Operation in this manner was conducted for 50 hours, producing 575 pounds of usable polymethyl methacrylate.

*Example 4*

A mixture consisting of 70 parts of methyl methacrylate, 30 parts of cumene and 0.105 part of benzoyl peroxide was added to a one gallon jacketed reactor as in Example 1, and heated. The temperature was slowly increased to 160° C. over a four hour period and maintained at that temperature for an additional four hours at a pressure of 90 p.s.i.g. At the end of this period, the total polymer solids in the reaction mixture was about 48 percent as determined by the previously described method. Part of the reaction mixture was continuously removed at a rate of about 6.3 pounds per hour through a back pressure valve set at 90 p.s.i.g. to a heated vacuum milling chamber as in Example 1. An amount of the initial feed mixture, at a rate equivalent to that removed, was continuously added to the reaction mixture to maintain constant volume and constant polymer solids in the reaction mixture of about 48 percent. The part of the reaction mixture which was removed was continuously milled in the milling chamber as described in Example 1 at 200° C. and 50 mm. Hg pressure for a total residence time of about one to five minutes. The plasticizer, dioctyl phthalate, was added to the milling chamber at a rate of about 75 grams per hour so as to maintain about 6 percent by weight of plasticizer in the product. The cumene and unreacted methyl methacrylate were volatilized in the milling chamber and recovered, and the devolatilized product was continuously discharged from the milling chamber as a viscous strand at a rate of about 2.8 pounds per hour, stretched 100 percent, and cut into ⅛ inch lengths, convenient for handling. The polymer had a methanol-soluble content of about 7.0 percent, consisting of six percent plasticizer and one percent monomer and cumene. The polymer had a reduced viscosity of 0.52 in chloroform at 25° C.

Operation in this manner was conducted for 20 hours, producing 56 pounds of usable polymethyl methacrylate.

*Example 5*

A mixture consisting of 65 parts of methyl methacrylate, 35 parts of cumene, and 0.13 part of cumene hydroperoxide was added to a one gallon jacketed reactor as in Example 1 and heated. The temperature was gradually increased to 135° C. over a four hour period and maintained at that level for four more hours at 50 p.s.i.g. pressure. At the end of this period, the total polymer solids in the reaction mixture amounted to about 30 percent. Part of the reaction mixture was continuously withdrawn at a rate of about 1.4 lbs. per hour, and an equivalent amount of the initial feed mixture at a rate equivalent to that removed was continuously added to the reaction mixture to maintain constant volume and constant polymer solids in the reaction mixture of about 30 percent. The portion of the reaction mixture removed was continuously milled in a milling chamber as described in Example 1 at 200° C. and 50 mm. Hg pressure for a total residence time of about one to five minutes. The plasticizer, dibutyl sebacate, was added to the milling chamber at a rate of about 62 grams per hour so as to maintain a concentration of about 10 percent by weight of plasticizer in the product. The cumene and unreacted methyl methacrylate were volatilized in the milling chamber and recovered, and the devolatilized product was continuously discharged from the milling chamber at a rate of about 1.4 pounds per hour, stretched 200 percent, and cut into ⅛ inch lengths convenient for molding or extruding operations. The polymer had a methanol-soluble content of about 13 percent consisting of 10 percent plasticizer and 3 percent cumene and unreacted monomer, and had a reduced viscosity of 0.89 in chloroform at 25° C.

Operation in this manner was conducted for 10 hours, producing 14 pounds of usable polymethyl methacrylate.

What is claimed is:

1. A process for the continuous polymerization of methyl methacrylate to high molecular weight solid polymers which includes the steps of continuously adding to a reactor maintained at a temperature between about 135° C. and about 170° C., a solution of methyl methacrylate and an alkylated benzene solvent selected from the class consisting of alkylated benzenes having at least one alkyl group attached to the benzene ring through a secondary carbon atom and alkylated benzenes having at least two alkyl groups other than methyl attached to the benzene ring through primary carbon atoms, said solvent having a boiling point between 150° C. and 250° C., said solution containing from one to three parts by weight of methyl methacrylate per part of solvent, at a rate sufficient to maintain polymer solids in the reaction mixture between about 25 and about 55 percent by weight, while continuously removing a portion of the reaction contents into a second heated chamber maintained at a temperature between about 160° C. and 300° C., removing substantially all of the volatile content in the said removed portion and recovering the solid polymethyl methacrylate thus produced.

2. A process for the continuous polymerizaiton of methyl methacrylate to high molecular weight solid polymers which includes the steps of continuously adding to a reactor maintained at a temperature of between about 135° C. to about 170° C., a solution of methyl methacrylate and cumene, containing from about one to about three parts by weight of methyl methacrylate per part of cumene, at a rate sufficient to maintain polymer solids in the reaction mixture between about 25 and about 55 percent by weight, while continuously removing a portion of the reactor contents into a second heated chamber maintained at a temperature between about 160° C. and 300° C., removing substantially all of the volatile content, and recovering the solid polymethyl methacrylate thus produced.

3. A process as defined by claim 2 wherein a free-radical polymerization catalyst is employed.

4. A process for the continuous polymerization of methyl methacrylate to high molecular weight solid polymers which includes the steps of heating a solution of methyl methacrylate monomer dissolved in cumene in amounts of between about one to about three parts by weight of methyl methacrylate monomer per part of cumene to a temperature between about 135° C. to about 170° C. to form a polymethyl methacrylate solids content in the mixture between about 25 to about 55 percent, thereafter continuously withdrawing a portion of the reaction mixture to a second heating zone and continuously adding methyl methacrylate monomer dissolved in cumene to the first heating zone at a rate such that the solids content of the reactor is maintained between about 25 to about 55 percent, heating the removed portion in the second heating zone at a temperature between about 160° C. to about 300° C., removing substantially all volatile matter and recovering the solid polymethyl methacrylate thus produced.

5. A process according to claim 4 wherein the second heating zone is a heated milling chamber maintained under reduced pressures.

6. A process according to claim 4 wherein a free-radical polymerization catalyst is employed.

References Cited in the file of this patent

UNITED STATES PATENTS

| 2,577,677 | Crouch | Dec. 4, 1951 |
| 2,752,387 | Rehberg | June 26, 1956 |
| 2,769,804 | Hanson | Nov. 6, 1956 |
| 2,777,832 | Mallison | Jan. 15, 1957 |

OTHER REFERENCES

Basu et al.: Proc. Roy. Soc. (London), 202A, 485–498 (1950).

Schildknecht et al.: "High Polymers," vol. X, pp. 178–9, Interscience Pub., Inc., New York (1956).